US006313642B1

United States Patent
Brooks

(10) Patent No.: US 6,313,642 B1
(45) Date of Patent: Nov. 6, 2001

(54) APPARATUS AND METHOD FOR TESTING AN ARCING FAULT DETECTION SYSTEM

(75) Inventor: Stanley J. Brooks, Rockvale, TN (US)

(73) Assignee: Square D Company, Palatine, IL (US)

( * ) Notice: Subject to any disclaimer, the term of this patent is extended or adjusted under 35 U.S.C. 154(b) by 992 days.

(21) Appl. No.: 08/788,969

(22) Filed: Jan. 24, 1997

Related U.S. Application Data

(63) Continuation-in-part of application No. 08/403,084, filed on Mar. 13, 1995, now abandoned.

(51) Int. Cl.[7] .......................... G01R 31/06; G01R 31/14; G01R 19/14; G01R 1/14
(52) U.S. Cl. .......................... 324/547; 324/133; 324/127; 324/510; 324/523; 324/526
(58) Field of Search ..................................... 324/547, 133, 324/127, 510, 523, 536

(56) References Cited

U.S. PATENT DOCUMENTS

| | | |
|---|---|---|
| H536 | 10/1988 | Strickland et al. . |
| Re. 30,678 | 7/1981 | Van Zeeland et al. . |
| 2,808,566 | 10/1957 | Douma . |
| 2,832,642 | 4/1958 | Lennox . |

(List continued on next page.)

FOREIGN PATENT DOCUMENTS

| | | |
|---|---|---|
| 0 094 871 A1 | 5/1983 | (EP) . |
| 0 615 327 | 9/1994 | (EP) . |

(List continued on next page.)

OTHER PUBLICATIONS

Antonio N. Paolantonio, P.E., Directional Couplers, R.F. Design, Sep./Oct. 6, 1979, pp. 40–49.

Alejandro Duenas, J., Directional Coupler Design Graphs For Parallel Coupled Lines and Interdigitated 3 dB Couplers, RF Design, Feb. 8, 1986, pp. 62–64.

(List continued on next page.)

*Primary Examiner*—Safet Metjahic
*Assistant Examiner*—Anjan K Deb
(74) *Attorney, Agent, or Firm*—Kareem M. Irfan; Larry I. Golden

(57) ABSTRACT

A system for testing an arcing fault detection system in an electrical distribution network having a line conductor carrying an electrical signal between a power source and a load, the arcing fault detection system including a sensor coupled to the line conductor for monitoring the electrical signal and generating a sensor signal representing the electrical signal, the arcing fault detection system generating an arc-indicative signal in response to the sensor signal having characteristics indicative of an arcing fault. The testing system couples the sensor to a test line simultaneously with the line conductor and periodically produces a test signal on the test line. The sensor simultaneously monitors the test signal and the electrical signal and produces a sensor signal representing both the test signal and the electrical signal when the test signal is present on the test line. The arcing fault detection system generates an arc-indicative signal in response to the sensor signal associated with either the test line or line conductor having characteristics indicative of an arcing fault. A diagnostic test integrator evaluates the status conditions of the test signal and the arc-indicative signal and generates a trip signal to trigger the interruption of the electrical signal in response to certain status conditions of the test signal and the arc-indicative signal.

28 Claims, 9 Drawing Sheets

U.S. PATENT DOCUMENTS

| | | |
|---|---|---|
| 3,471,784 | 10/1969 | Arndt et al. . |
| 3,538,241 | 11/1970 | Rein . |
| 3,588,611 | 6/1971 | Lambden et al. . |
| 3,600,502 | 8/1971 | Wagenaar et al. . |
| 3,622,872 | 11/1971 | Boaz et al. . |
| 3,684,955 | 8/1972 | Adams . |
| 3,746,930 | 7/1973 | Van Best et al. . |
| 3,775,675 | 11/1973 | Freeze et al. . |
| 3,812,337 | 5/1974 | Crosley . |
| 3,858,130 | 12/1974 | Misencik . |
| 3,869,665 | 3/1975 | Kenmochi et al. . |
| 3,878,460 | 4/1975 | Nimmersjo . |
| 3,911,323 | 10/1975 | Wilson et al. . |
| 3,914,667 | 10/1975 | Waldron . |
| 3,932,790 * | 1/1976 | Muchnick ............. 324/133 |
| 3,939,410 | 2/1976 | Bitsch et al. . |
| 4,074,193 | 2/1978 | Kohler . |
| 4,081,852 | 3/1978 | Coley et al. . |
| 4,087,744 | 5/1978 | Olsen . |
| 4,156,846 | 5/1979 | Harrold et al. . |
| 4,169,260 | 9/1979 | Bayer . |
| 4,214,210 | 7/1980 | O'Shea . |
| 4,245,187 | 1/1981 | Wagner et al. . |
| 4,251,846 | 2/1981 | Pearson et al. . |
| 4,264,856 | 4/1981 | Frierdich et al. . |
| 4,316,187 | 2/1982 | Spencer . |
| 4,354,154 | 10/1982 | Olsen . |
| 4,356,443 | 10/1982 | Emery . |
| 4,387,336 | 6/1983 | Joy et al. . |
| 4,459,576 | 7/1984 | Fox et al. . |
| 4,466,071 | 8/1984 | Russell, Jr. . |
| 4,616,200 | 10/1986 | Fixemer et al. . |
| 4,639,817 | 1/1987 | Cooper et al. . |
| 4,642,733 | 2/1987 | Schacht . |
| 4,644,439 | 2/1987 | Taarning . |
| 4,652,867 | 3/1987 | Masot . |
| 4,658,322 | 4/1987 | Rivera . |
| 4,697,218 | 9/1987 | Nicolas . |
| 4,702,002 | 10/1987 | Morris et al. . |
| 4,707,759 | 11/1987 | Bodkin . |
| 4,771,355 | 9/1988 | Emery et al. . |
| 4,810,954 | 3/1989 | Fam . |
| 4,833,564 * | 5/1989 | Pardue ................. 361/42 |
| 4,835,648 | 5/1989 | Yamauchi . |
| 4,845,580 | 7/1989 | Kitchens . |
| 4,853,818 | 8/1989 | Emery et al. . |
| 4,858,054 | 8/1989 | Franklin . |
| 4,866,560 | 9/1989 | Allina . |
| 4,882,682 | 11/1989 | Takasuka et al. . |
| 4,893,102 | 1/1990 | Bauer . |
| 4,901,183 | 2/1990 | Lee . |
| 4,922,368 | 5/1990 | Johns . |
| 4,931,894 | 6/1990 | Legatti . |
| 4,939,495 | 7/1990 | Peterson et al. . |
| 4,949,214 | 8/1990 | Spencer . |
| 4,969,063 | 11/1990 | Scott et al. . |
| 5,047,724 | 9/1991 | Boksiner et al. . |
| 5,051,731 | 9/1991 | Guim et al. . |
| 5,121,282 | 6/1992 | White . |
| 5,168,261 | 12/1992 | Weeks . |
| 5,185,684 | 2/1993 | Beihoff et al. . |
| 5,185,685 | 2/1993 | Tennies et al. . |
| 5,185,686 | 2/1993 | Hansen et al. . |
| 5,185,687 | 2/1993 | Beihoff et al. . |
| 5,206,596 | 4/1993 | Beihoff et al. . |
| 5,208,542 | 5/1993 | Tennies et al. . |
| 5,223,795 | 6/1993 | Blades . |
| 5,224,006 | 6/1993 | MacKenzie et al. . |
| 5,257,157 | 10/1993 | Epstein . |
| 5,280,404 | 1/1994 | Ragsdale . |
| 5,286,933 | 2/1994 | Pham . |
| 5,307,230 | 4/1994 | MacKenzie . |
| 5,334,939 | 8/1994 | Yarbrough . |
| 5,353,014 | 10/1994 | Carroll et al. . |
| 5,359,293 | 10/1994 | Boksiner et al. . |
| 5,363,269 | 11/1994 | McDonald . |
| 5,383,084 | 1/1995 | Gershen et al. . |
| 5,388,021 | 2/1995 | Stahl . |
| 5,420,740 | 5/1995 | MacKenzie et al. . |
| 5,434,509 | 7/1995 | Blades . |
| 5,444,424 | 8/1995 | Wong et al. . |
| 5,446,431 | 8/1995 | Leach et al. . |
| 5,448,443 | 9/1995 | Muelleman . |
| 5,459,630 | 10/1995 | MacKenzie et al. . |
| 5,483,211 | 1/1996 | Carrodus et al. . |
| 5,485,093 | 1/1996 | Russell et al. . |
| 5,493,278 | 2/1996 | MacKenzie et al. . |
| 5,506,789 | 4/1996 | Russell et al. . |
| 5,510,946 | 4/1996 | Franklin . |
| 5,512,832 | 4/1996 | Russell et al. . |
| 5,519,561 | 5/1996 | Mrenna et al. . |
| 5,546,266 | 8/1996 | Mackenzie et al. . |
| 5,561,605 | 10/1996 | Zuercher et al. . |
| 5,568,371 | 10/1996 | Pitel et al. . |
| 5,578,931 | 11/1996 | Russell et al. . |
| 5,590,012 | 12/1996 | Dollar . |
| 5,602,709 | 2/1997 | Al-Dabbagh . |
| 5,608,328 | 3/1997 | Sanderson . |
| 5,657,244 | 8/1997 | Seitz . |
| 5,659,453 | 8/1997 | Russell et al. . |
| 5,691,869 | 11/1997 | Engel et al. . |
| 5,729,145 | 3/1998 | Blades . |
| 5,835,319 | 11/1998 | Welles, II et al. . |
| 5,835,321 | 11/1998 | Elms et al. . |

FOREIGN PATENT DOCUMENTS

| | | |
|---|---|---|
| 0 649 207 A1 | 4/1995 | (EP) . |
| 0 748 021 A1 | 12/1996 | (EP) . |
| 0 762 591 A2 | 3/1997 | (EP) . |
| 0 802 602 A2 | 10/1997 | (EP) . |
| 2 177 561 | 6/1985 | (GB) . |
| 2285886A | 7/1995 | (GB) . |
| WO 97/30501 | 8/1997 | (WO) . |

OTHER PUBLICATIONS

Jean–Francois Joubert, Feasibility of Main Service Ground–Fault Protection On The Electrical Service To Dwelling Units, Consultants Electro–Protection Ins., 1980, Michelin St., Laval, Quebec H7L 9Z7. Oct. 26, 1990, pp. 1–77.

B.D. Russell, Detection Of Arcing Faults On Distribution Feeders, Texas A & M Research Foundation, Box H. College Station, Texas 77843, Final Report Dec., 1982, pp. 1–B18.

* cited by examiner

US 6,313,642 B1

APPARATUS AND METHOD FOR TESTING AN ARCING FAULT DETECTION SYSTEM

CROSS REFERENCE TO RELATED APPLICATIONS

This application is a continuation-in-part of U.S. patent application Ser. No. 08/403,084, filed Mar. 13, 1995, now abandoned and entitled "Device and Method for Testing Arcing Fault Detectors". The parent application has the same assignee as the present invention and is incorporated herein by reference in its entirety.

FIELD OF THE INVENTION

The present invention relates generally to arcing fault detection systems for protecting an electrical distribution system from arcing faults. More particularly, the present invention relates to an apparatus and method for testing an arcing fault detection system.

BACKGROUND OF THE INVENTION

Electrical systems in residential, commercial and industrial applications usually include a panelboard for receiving electrical power from a utility source. The power is connected to the panelboard via line bus bars and neutral bus bars. The electrical power is delivered from the panelboard to designated branch circuits through line and neutral conductors supplying one or more loads. Typically, various types of protective devices are mounted to the bus bars of the panelboard to protect the branch circuits from hazardous electrical conditions and reduce the risk of injury, damage or fires.

Circuit breakers are a well known type of protective device which are designed to trip open and interrupt an electric circuit in response to detecting overloads and short circuits. Overload protection is provided by a thermal element which, when heated by the increased current, will cause the circuit breaker to trip and interrupt the power. This can occur when too many loads draw power from the same branch circuit at the same time, or when a single load draws more power than the branch circuit is designed to carry. Short circuit protection is provided by an electromagnetic element that trips when sensing high current flow. Circuit breakers may also provide protection against ground faults which occur when current flows from a hot conductor to ground through a person or object.

Arcing faults, which occur when electric current "arcs" or flows through ionized gas between two ends of a broken conductor, between two conductors supplying a load, or between a conductor and ground, comprise one type of electrical hazard that can not generally be detected by standard circuit breakers. This is because current levels associated with arcing faults are generally not high enough to trip the thermal or electromagnetic elements associated with standard circuit breakers. Arcing faults typically result from corroded, worn or aged wiring or insulation, loose connections, wiring damaged by nails or staples through the insulation, and electrical stress caused by repeated overloading, lightning strikes, etc. The presence of an arcing fault creates a significant fire hazard because it generates heat which may ignite the conductor insulation and adjacent combustible materials.

Arcing fault detection systems known in the art generally sense the current passing through the line conductor of a branch circuit, process the sensed information to determine whether the characteristics of the line current represent the occurrence of an arcing fault, and trip open the branch circuit if an arcing fault has occurred. A preferred arcing fault detection system of this type is described in pending U.S. patent application Ser. No. 08/600,512, entitled "Arcing Fault Detection System", assigned to the assignee of the present invention and incorporated herein by reference. The arcing fault detection system may sense line voltage rather than line current.

SUMMARY OF THE INVENTION

In accordance with one aspect of the present invention, there is provided a system for testing an arcing fault detection system in an electrical distribution network having a line conductor carrying an electrical signal between a power source and a load, the arcing fault detection system including a sensor coupled to the line conductor for monitoring the electrical signal and generating a sensor signal representing the electrical signal, the arcing fault detection system generating an arc-indicative signal in response to the sensor signal having characteristics indicative of an arcing fault. The testing system couples the sensor to a test line simultaneously with the line conductor and periodically produces a test signal on the test line. The sensor simultaneously monitors the test signal and the electrical signal and produces a sensor signal representing both the test signal and the electrical signal when the test signal is present on the test line. The arcing fault detection system generates an arc-indicative signal in response to the sensor signal associated with either the test line or line conductor having characteristics indicative of an arcing fault. A diagnostic test integrator evaluates the status conditions of the test signal and the arc-indicative signal and generates a trip signal to trigger the interruption of the electrical signal in response to certain status conditions of the test signal and the arc-indicative signal.

BRIEF DESCRIPTION OF THE DRAWINGS

In the drawings, which comprise a portion of this disclosure.

Figure 1:
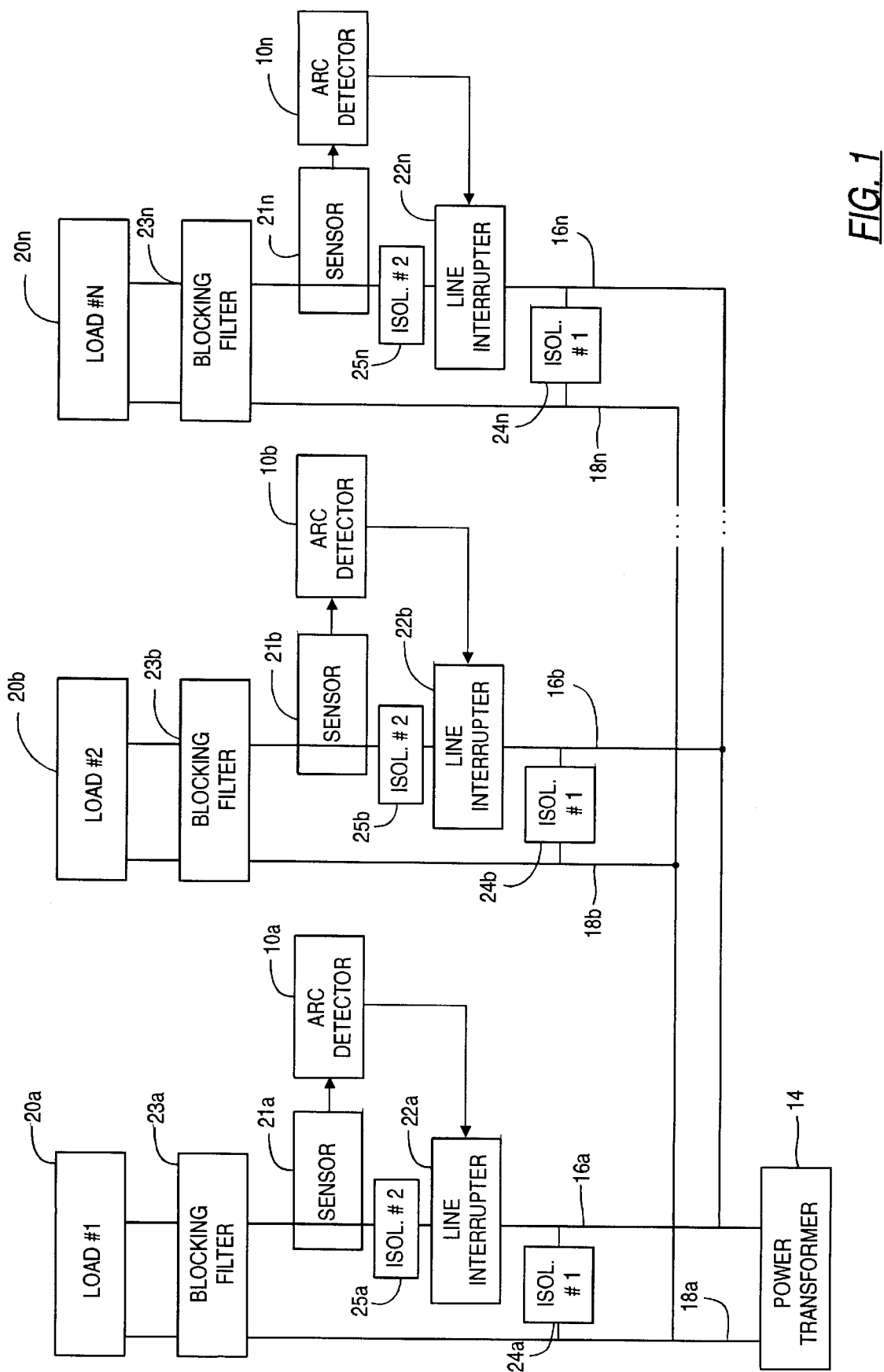
FIG. 1 is a block diagram of an arcing fault detection system having a sensor connected to the line conductor of a branch circuit.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, arcing fault detectors 10a, 10b . . . 10n are connected to n branches of an electrical distribution system 12 having a utility company power transformer 14 as a source of electric power. The electrical distribution system 12 includes line conductors 16a, 16b . . . 16n and neutral conductors 18a, 18b . . . 18n which distribute electrical power to loads 20a, 20b . . . 20n through corresponding sensors 21a, 21b . . . 21n, line interrupters 22a, 22b . . . 22n, and blocking filters 23a, 23b . . . 23n. The line conductors 16 and a neutral conductors 18 are typically at 240 volts or 120 volts, and a frequency of 60 Hz.

Each of the line interrupters 22 is preferably a circuit breaker which includes an overload trip mechanism having a thermal/magnetic characteristic which trips the breaker contacts to an open circuit condition in response to a given overload condition, to disconnect the corresponding load 20 from the power source, as is known in the art. It is also known to provide the circuit breaker 22 with ground fault interrupter circuitry responding to a line or neutral-to-ground fault to energize a trip solenoid which trips the circuit breaker and opens the contacts.

The sensors 21 monitor the rate of change of electrical current in the respective line conductors 16 and produce signals representing the rate of change. The rate-of-change signal from each sensor 21 is supplied to the corresponding arcing detector 10, which produces a pulse each time the rate-of-change signal increases above a selected threshold. The rate-of-change signal and/or the pulses produced therefrom are filtered to eliminate signals or pulses outside a selected frequency range. The final pulses are then monitored to detect when the number of pulses that occur within a selected time interval exceeds a predetermined threshold. In the event that the threshold is exceeded, the detector 10 generates an arcing-fault-detection signal that can be used to trip the corresponding line interrupter 22.

In one embodiment of the present invention, the sensor 21 comprises a toroidal sensor having an annular core encompassing the current-carrying load line, with the sensing coil wound helically on the core. The core is made of magnetic material such as a ferrite, iron, or molded permeable powder capable of responding to rapid changes in flux. A preferred sensor uses a ferrite core wound with 200 turns of 24–36 gauge copper wire to form the sensing coil. An air gap may be cut into the core to reduce the permeability to about 30. The core material preferably does not saturate during the relatively high currents produced by parallel arcs, so that arc detection is still possible at those high current levels.

Other means for sensing the rate of change of the current in a line conductor are contemplated by the present invention. By Faraday's Law, any coil produces a voltage proportional to the rate of change in magnetic flux passing through the coil. The current associated with an arcing fault generates a magnetic flux around the conductor, and the coil of the sensor 21 intersects this flux to produce a signal. Other suitable sensors include a toroidal transformer with a core of magnetic material or an air core, an inductor or a transformer with a laminated core of magnetic material, and inductors mounted on printed circuit boards. Various configurations for the sensor core are contemplated by the present invention and include toroids which have air gaps in their bodies.

Preferably, the rate-of-change signal produced by the sensor 21 represents only fluctuations in the rate of change within a selected frequency band. The sensor bandpass characteristic is preferably such that the lower frequency cut-off point rejects the power frequency signals, while the upper frequency cut-off point rejects the high frequency signals generated by noisy loads such as a solder gun, electric saw, electric drill, or like appliances, equipment, or tools. The resulting output of the sensor 21 is thus limited to the selected frequency band associated with arcing faults, thereby eliminating or reducing spurious fluctuations in the rate-of-change signal which could result in nuisance tripping. As an example, the sensor bandpass characteristic may have: (1) a lower frequency cut-off point or lower limit of 60 Hz so as to reject power frequency signals, and (2) an upper frequency cut-off point or upper limit of approximately 1 MHz so as to effectively reject high frequency signals associated with noisy loads. These specific frequency cut-off points for the sensor bandpass characteristic are by way of example only, and other appropriate frequency cut-off limits may be adopted depending upon actual frequency ranges for the power signals as well as the noisy load signals.

The desired bandpass characteristic is realized by appropriately selecting and adjusting the self-resonant frequency of the sensor. The current-type sensor is selected to have a predetermined self-resonant frequency which defines associated upper and lower frequency cut-off or roll-off points for the operational characteristics of the sensor. Preferably, the current-type sensor is designed to exhibit the desired bandpass filtering characteristic as it operates to detect the rate of change of current variations within the load line being monitored. The present invention contemplates other means for bandpass filtering the signal output within the selected frequency band. For example, a bandpass filter or a combination of filters in a circuit can be used to attenuate frequencies above or below the cut-off points for the selected frequency band.

Figure 2:
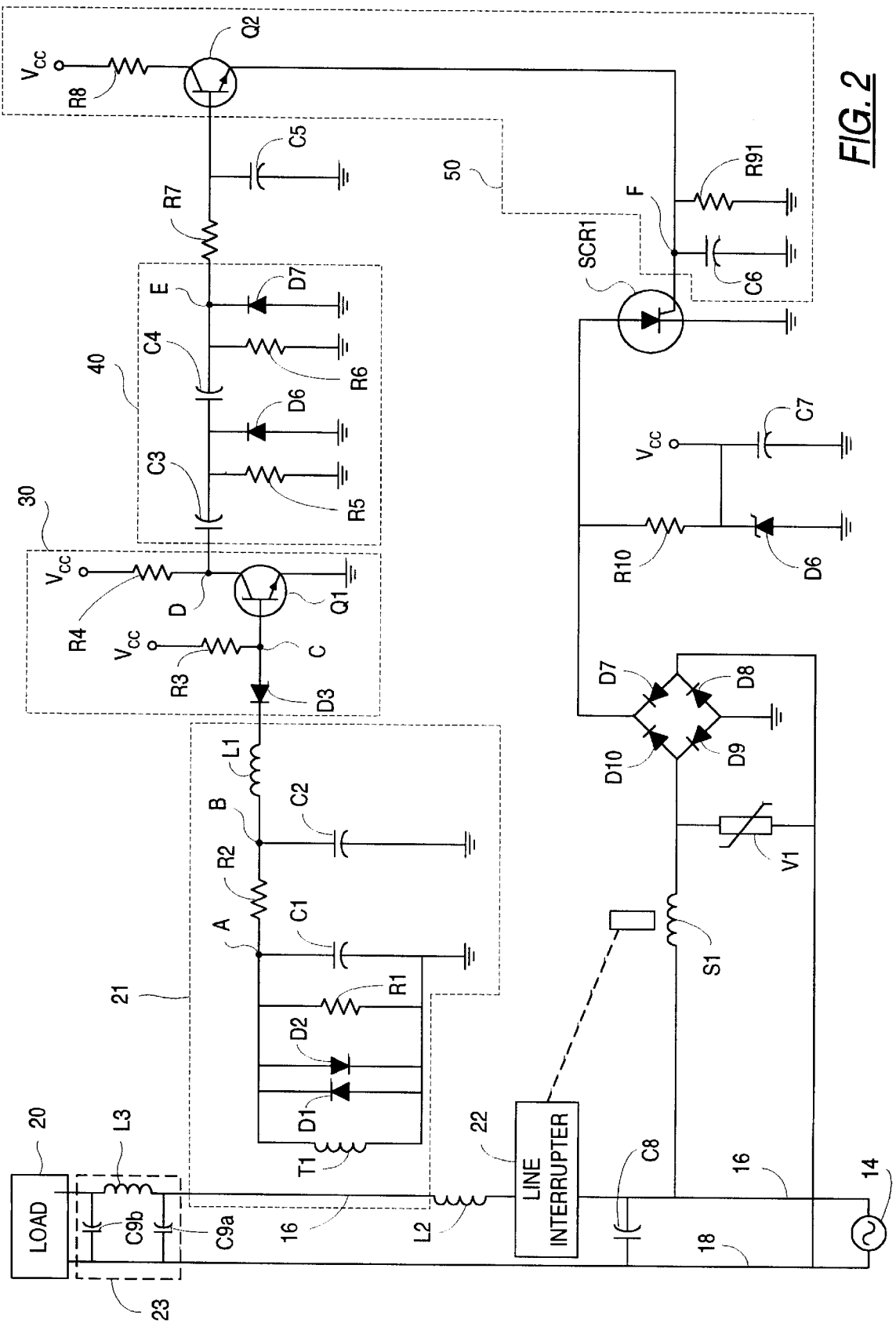
FIG. 2 is a schematic diagram of an electrical circuit for implementing the arcing fault detection system illustrated in FIG. 1.

FIG. 2 illustrates a preferred circuit for the arcing fault detection system of FIG. 1. The sensor 21 comprises a sensor coil T1 which is wound on a core surrounding the line conductor 16. Connected in parallel with the sensor coil T1 are a pair of diodes D1 and D2 which serve as clamping devices during high-power transient conditions. A resistor R1 in parallel with the diodes D1 and D2 dampens self-ringing of the sensor, during high-power transients. A pair of capacitors C1 and C2 in parallel with the resistor R1, and a resistor R2 and an inductor L1 connected in series to the input to a comparator 30, are tuned to assist in attaining the desired rolloff characteristics of the filtering network formed thereby. For example, with the illustrative values listed below for the components of the circuit of FIG. 2, the sensor has a passband extending from about 10 KHz to about 100 KHz, with sharp rolloff at both sides of the passband.

Figure 3A:
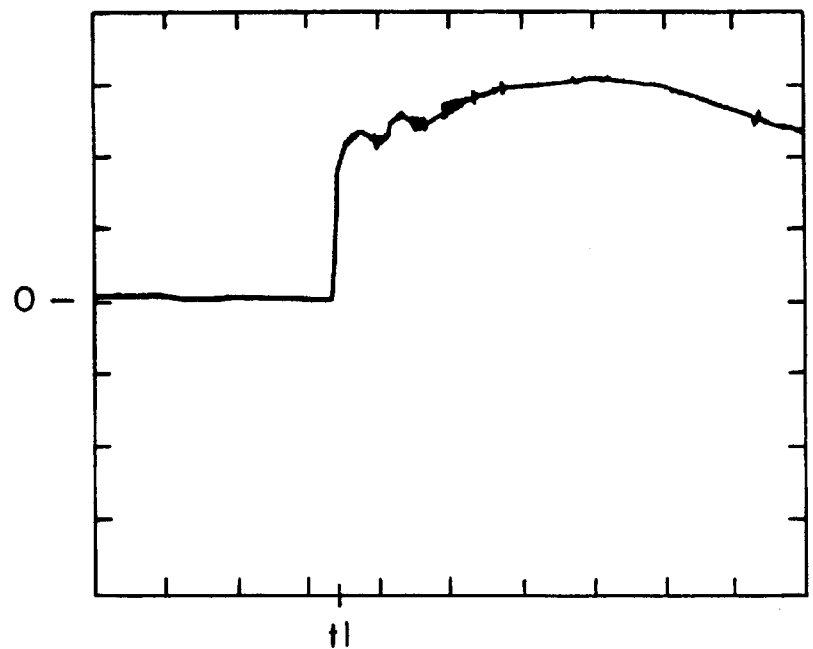
FIGS. 3a through 3g are waveforms at various points in the circuit of FIG. 2.
Figure 3B:
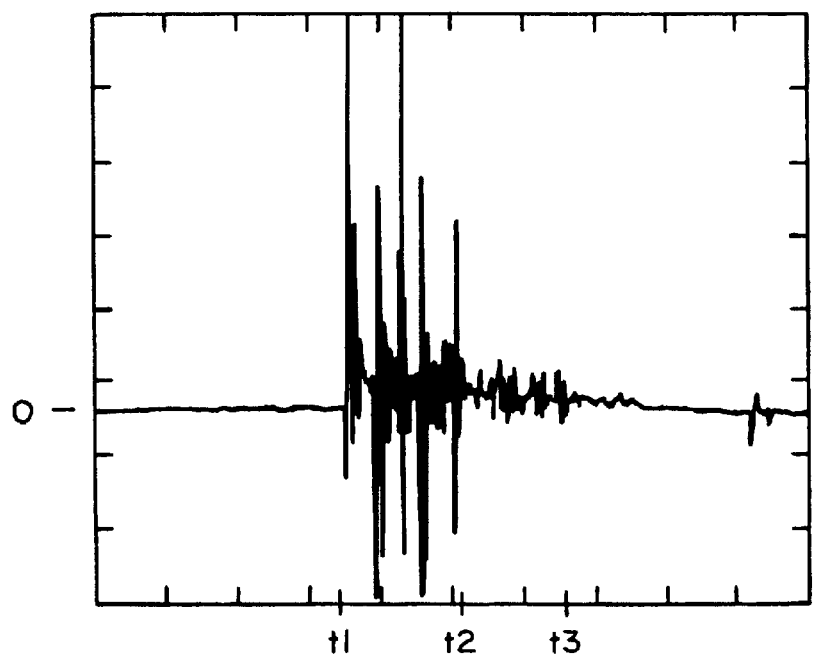

The operation of the circuit of FIG. 2 can be more clearly understood by reference to the series of waveforms in FIGS. 3a through 3g. FIG. 3a is an actual waveform from an oscilloscope connected to a line conductor 16 carrying a-c. power at 60 Hz and experiencing a high-frequency disturbance beginning at time t1. Because the high-frequency disturbance is within the frequency range to which the sensor 21 is sensitive (e.g., from about 10 KHz to about 100 KHz), the disturbance results in a burst of high-frequency noise in the di/dt output signal (FIG. 3b) from the sensor 21 (at point A in the circuit of FIG. 2), beginning at time t1. The noise burst has a relatively high amplitude from time t1 until approximately time t2, and then continues at a low amplitude from time t2 to about time t3.

The magnitude of the rate-of-change signal from the sensor 21 is compared with the magnitude of a fixed reference signal in a comparator 30, which produces an output voltage only when the magnitude of the rate-of-change signal crosses that of the reference signal. This causes the detector to ignore low-level signals generated by the sensor 21. All signals having a magnitude above the threshold level set by the magnitude of the reference signal are amplified to a preset maximum value to reduce the effect of a large signal. In the comparator 30, a transistor Q1 is normally turned on with its base pulled high by a resistor R3. A diode D3 changes the threshold and allows only the negative pulses from the sensor 21 to be delivered to the base of transistor Q1. When the signal to the comparator drops below the threshold level (minus 0.2 volt for the circuit values listed below), this causes the transistor Q1 to turn off. This causes the collector of the transistor Q1 to rise to a predetermined voltage, determined by the supply voltage $V_{cc}$, a resistor R4 and the input impedance of a single-shot pulse generator circuit 40. This collector voltage is the output of the comparator circuit 30. The collector voltage remains high as long as the transistor Q1 is turned off, which continues until the signal from the sensor 21 rises above the threshold level again. The transistor Q1 then turns on again, causing the collector voltage to drop. The end result is a pulse output from the comparator, with the width of the pulse corresponding to the time interval during which the transistor Q1 is turned off, which in turn corresponds to the time interval during which the negative-going signal from the sensor 21 remains below the threshold level of the comparator.

Figure 3C:
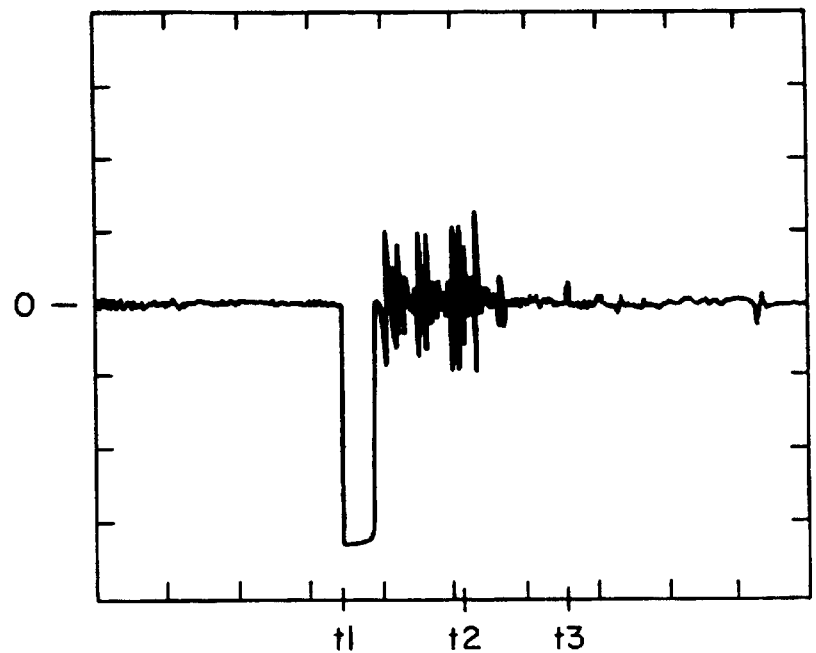
Figure 3D:
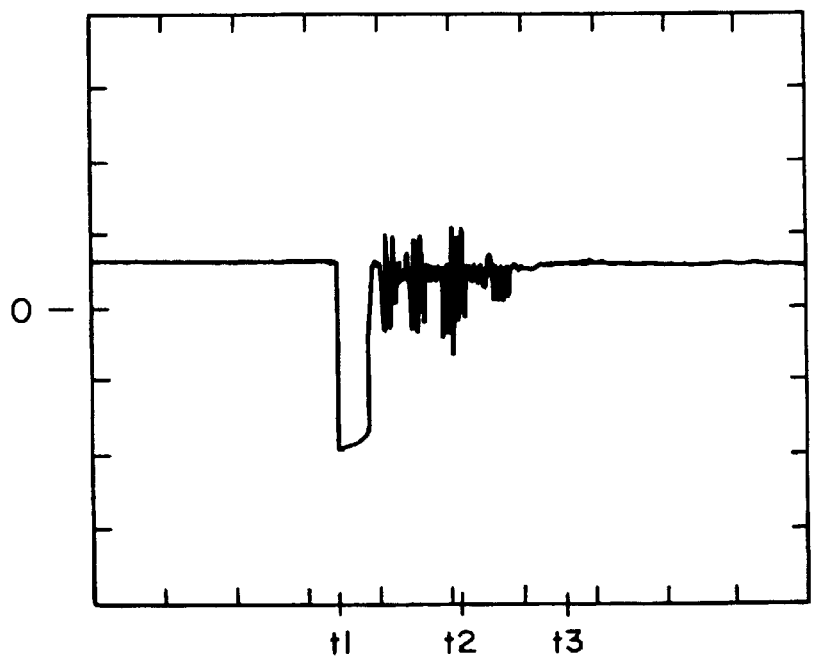

The noise burst in the sensor output is filtered to produce the waveform shown in FIG. 3c at point B in the circuit of FIG. 2. The waveform at point C in the circuit of FIG. 2 is shown in FIG. 3d, and it can be seen that the amplitude has been reduced and a d-c. offset has been introduced by summing the filtered di/dt signal with a d-c. bias from the supply voltage $V_{cc}$ at point C. This is the input signal to the base of the transistor Q1.

Figure 3E:
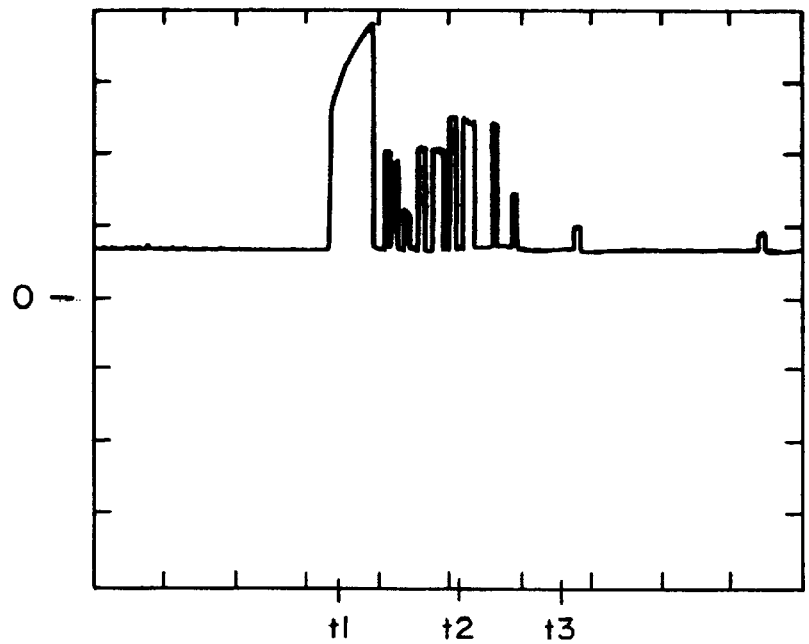

The output of the transistor Q1 is a series of positive-going pulses corresponding to the negative-going peaks in the input signal. The transistor output, at point D in the circuit of FIG. 2, is shown in FIG. 3e. It can be seen that the transistor circuit functions as a comparator by producing output pulses corresponding only to negative-going peaks that exceed a certain threshold in the filtered di/dt signal shown in FIG. 3c. At this point in the circuit, the pulses vary in both width and amplitude, as can be seen in FIG. 3e.

To convert the output pulses of the comparator 30, which vary in both width and amplitude, into a series of pulses of substantially constant width and amplitude, the comparator output is fed to a single-shot pulse generator circuit 40. This high-pass filter circuit includes a pair of capacitors C3 and C4 connected in series to the collector of the transistor Q1, and two resistor-diode pairs connected in parallel from opposite sides of the capacitor C4 to ground. The pulses produced by this circuit will be described in more detail below in connection with the waveforms shown in FIG. 3. The output pulses are predominantly pulses of equal width and amplitude, although occasional larger or smaller pulses can result from especially large or small input pulses.

Figure 3F:
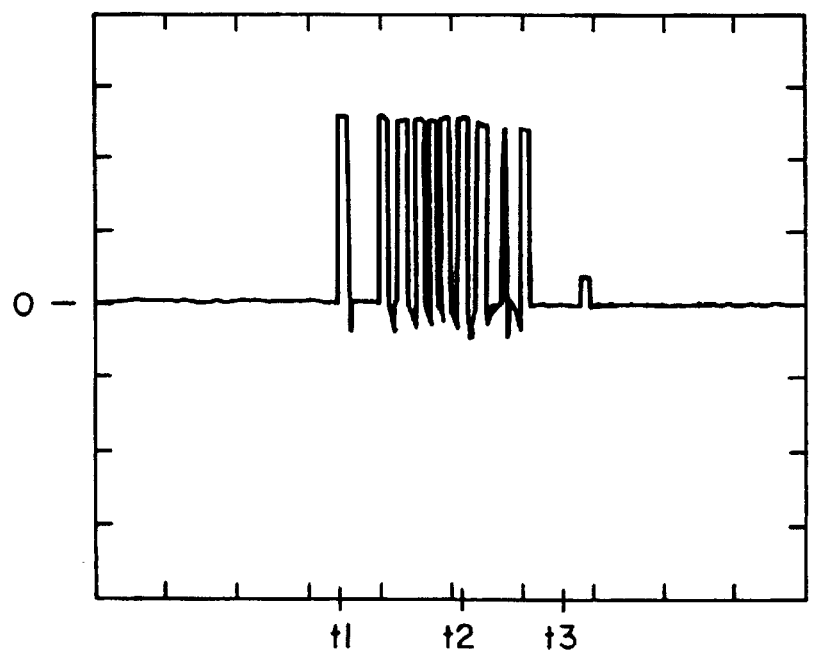

The variable-width and variable-amplitude pulses of FIG. 3e are converted to a series of pulses of substantially constant width and amplitude by the single-shot pulse generator circuit 40. The output of this circuit 40, at point E in the circuit of FIG. 2, is shown in FIG. 3f. Although all the pulses shown in FIG. 3f are of substantially the same size, larger or smaller pulses may be produced by di/dt spikes that are excessively large or excessively small. The vast majority of the pulses at point E, however, are substantially independent of the amplitude and duration of the corresponding spikes in the di/dt signal, provided the spikes are large enough to produce an output pulse from the comparator 30.

The substantially uniform pulses produced by the circuit 40 are supplied to the base of a transistor Q2 through a current-limiting resistor R7. A capacitor C5 connected from the transistor base to ground improves the sharpness of the roll-off of the bandpass filtering. The transistor Q2 is the beginning of an integrator circuit 50 that integrates the pulses produced by the circuit 40. The pulses turn the transistor on and off to charge and discharge a capacitor C6 connected between the transistor emitter and ground. A resistor R9 is connected in parallel with the capacitor C6, and a resistor R8 connected between the supply voltage and the collector of the transistor Q2 determines the level of the charging current for the capacitor C6. The magnitude of the charge on the capacitor C6 at any given instant represents the integral of the pulses received over a selected time interval. Because the pulses are substantially uniform in width and amplitude, the magnitude of the integral at any given instant is primarily a function of the number of pulses received within the selected time interval immediately preceding that instant. Consequently, the value of the integral can be used to determine whether an arcing fault has occurred.

Figure 3G:
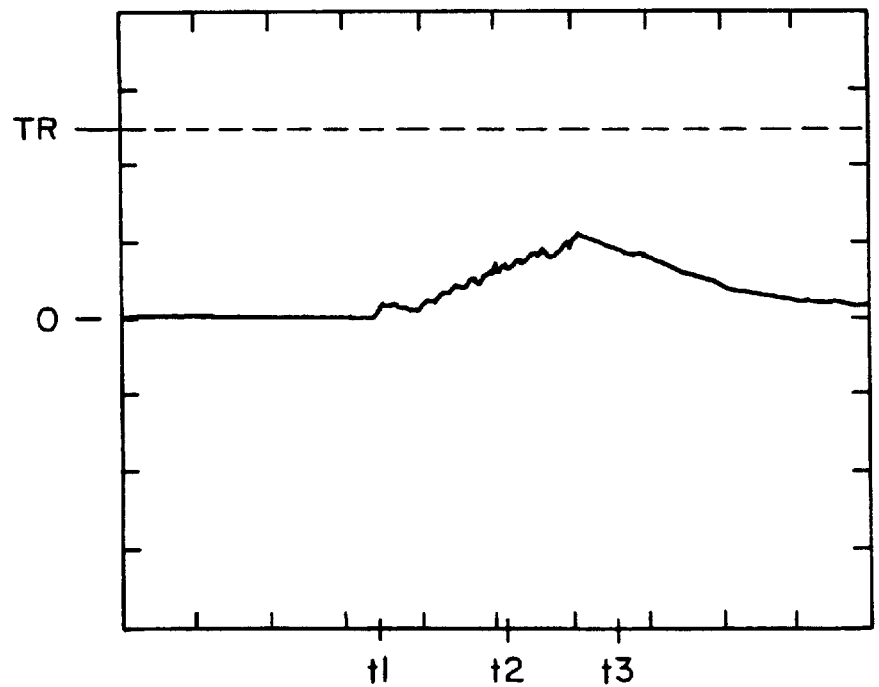

The integral signal produced by the circuit 50 is shown in FIG. 3g, taken at point F in the circuit of FIG. 2. It can be seen that the integrator circuit charges each time it receives a pulse from the circuit 40, and then immediately begins to discharge. The charge accumulates only when the pulses appear at a rate sufficiently high that the charge produced by one pulse is less than the discharge that occurs before the next pulse arrives. If the pulses arrive in sufficient number and at a sufficient rate to increase the integral signal to a trip threshold level TR (FIG. 3g), SCR1 is triggered to trip the circuit breaker. The circuit is designed so that this occurs only response to a di/dt signal representing an arcing fault.

When SCR1 is turned on, a trip solenoid S1 is energized to disconnect the load from the circuit in the usual manner. Specifically, turning on SCR1 causes current to flow from line to neutral through a diode bridge formed by diodes D7–D10, thereby energizing the solenoid to open the circuit breaker contacts in the line 16 and thereby disconnect the protected portion of the system from the power source. The d-c. terminals of the diode bridge are connected across SCR1, and the voltage level is set by a zener diode D6 in series with a current-limiting resistor R10. A varistor V1 is connected across the diode bridge as a transient suppressor. A filtering capacitor C7 is connected across the zener diode D6. The trip circuit loses power when the circuit breaker contacts are opened, but of course the contacts remain open until reset.

One example of a circuit that produces the desired result described above is the circuit of FIG. 2 having the following values:

| | |
|---|---|
| D1 | 1N4148 |
| D2 | 1N4148 |
| D3 | 1N4148 |
| D4 | 1N4148 |
| D5 | 1N4148 |
| D6 | 27v zener |
| R1 | 3.01K |
| R2 | 1.3K |
| R3 | 174K |
| R4 | 27.4K |
| R5 | 10K |
| R6 | 10K |
| R7 | 10K |
| R8 | 4.2K |
| R9 | 4.75K |
| R10 | 24K |
| L1 | 3300 uH |
| L2 | 500 uH |
| L3 | 500 uH |
| C1 | 0.012 uF |
| C2 | 0.001 uF |
| C3 | 0.001 uF |
| C4 | 0.001 uF |
| C5 | 0.001 uF |
| C6 | 6.8 uF |
| C7 | 1.0 uF |
| C8 | 1.0 uF |
| Q1 | 2N2222A |
| Q2 | 2N2222A |
| SCR1 | CR08AS-12 made by POWEREX-Equal |
| $V_{cc}$ | 27 v |

Although a circuit breaker is the most commonly used line interrupter, the output device may be a comparator, SCR, relay, solenoid, circuit monitor, computer interface, lamp, audible alarm, etc.

It will be understood that a number of modifications may be made in the circuit of FIG. 2. For example, the discrete bandpass filter between the sensor and the comparator can be replaced with an active filter using an operational amplifier. As another example, a single-shot timer can be used in place of the single-shot pulse generator in the circuit of FIG. 2. This circuit can receive the output signal from an active filter as the trigger input to an integrated-circuit timer, with the output of the timer supplied through a resistor to the same integrator circuit formed by the resistor R9 and capacitor C6 in the circuit of FIG. 2.

Figure 4:
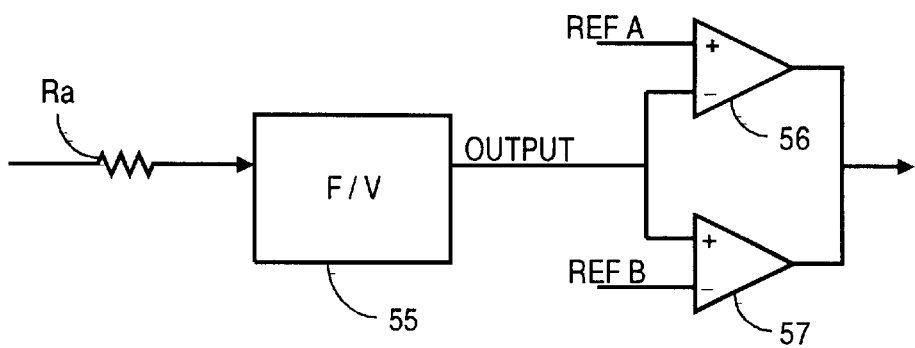
FIG. 4 is a schematic diagram of an alternative circuit for use in place of the comparator and single-shot pulse generator in the circuit of FIG. 2.

FIG. 4 illustrates a frequency-to-voltage converter circuit that can be used in place of all the circuitry between point A and the integrator circuit in FIG. 2. In this circuit, the signal from point A in FIG. 2 is supplied through a resistor Ra to a frequency/voltage converter integrated circuit 55 such as an AD537 made by Analog Devices Inc. The output of the integrated circuit 55 is fed to a pair of comparators 56 and 57 that form a conventional window comparator. Specifically, the output of the circuit 55 is applied to the inverting input of a comparator 56 and to the non-inverting input of a comparator 57. The other inputs of the comparators 56 and 57 receive two different reference signals A and B which set the limits of the window, i.e., the only signals that pass through the window comparator are those that are less than reference A and greater than reference B.

Figure 5:
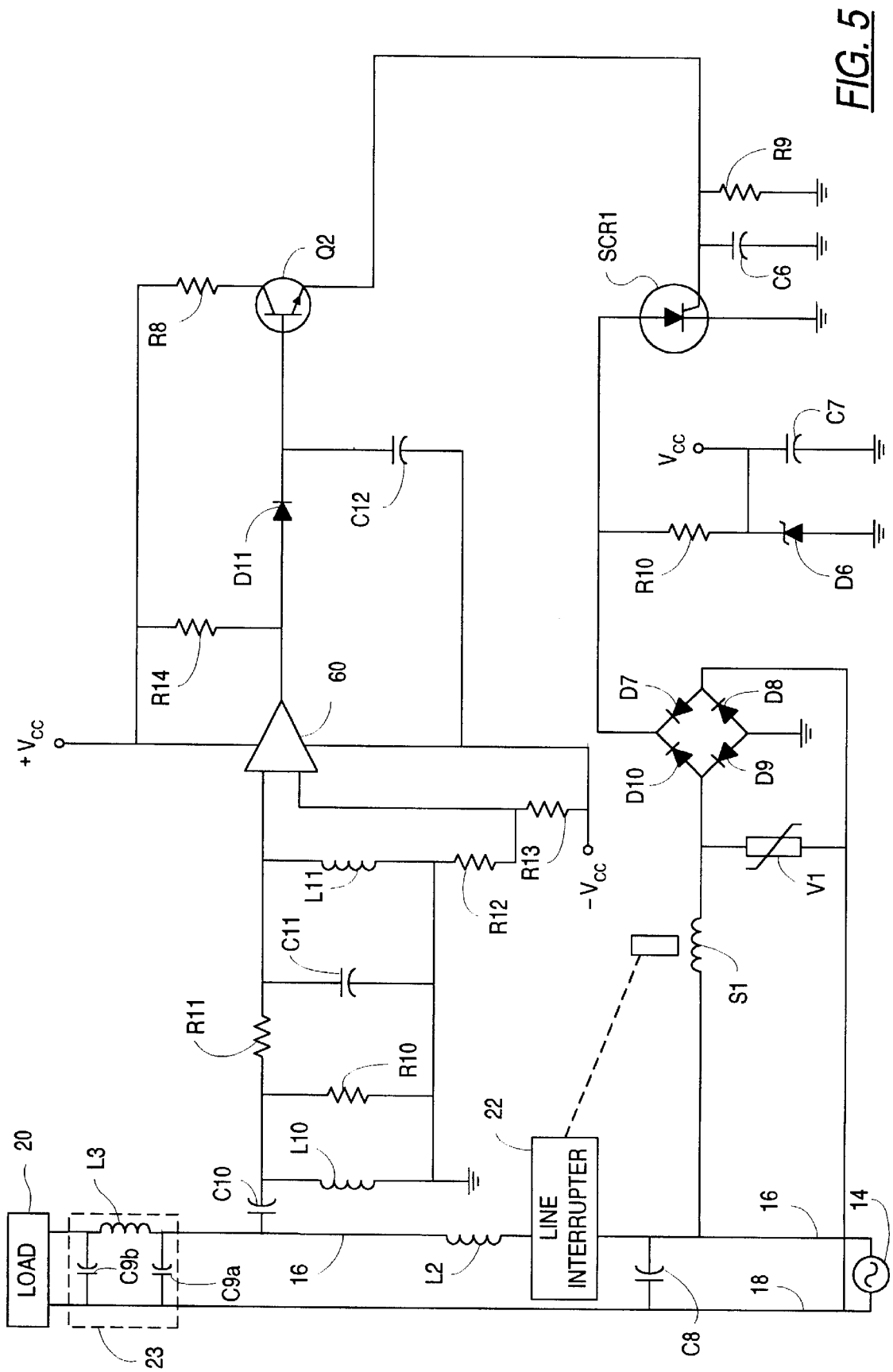
FIG. 5 is a schematic diagram of an alternative circuit for implementing the arcing fault detection system illustrated in FIG. 1.

FIG. 5 illustrates an arc detector 10 for sensing the rate of change of the line voltage, i.e., dv/dt, rather than current. The sensor in this circuit is a capacitor C10 connected between a line conductor 16 and an inductor L10 leading to ground. The inductor L10 forms part of a bandpass filter that passes only those signals falling within the desired frequency band, e.g., between 10 KHz and 100 KHz. The filter network also includes a resistor R10, a capacitor C11 and a second inductor L11 in parallel with the first inductor L10, and a resistor R11 connected between the resistor R10 and the capacitor C11. The resistor R10 dampens the ringing between the capacitor C10 and the inductor L10, and the resistor R11 adjusts the threshold or sensitivity of the circuit. The inductors L10 and L11 provide low-frequency roll-off at the upper end of the pass band, and a capacitor C11 provides the high-frequency roll-off at the lower end of the pass band.

The capacitor C10 may be constructed by attaching a dielectric to the line bus so that the bus forms one plate of the capacitor. The second plate of the capacitor is attached on the opposite side of the dielectric from the bus. The sensor circuit is connected to the second plate.

The output of the bandpass filter described above is supplied to a comparator 60 to eliminate signals below a selected threshold, and to limit large signals to a preselected maximum amplitude. The filter output is applied to the inverting input of the comparator 60, through the resistor R11, while the non-inverting input receives a reference signal set by a voltage divider formed by a pair of resistors R12 and R13 connected between $V_{cc}$ and ground. The comparator 60 eliminates very low levels of signal received from the sensor. The comparator 60 is normally off when there is no arcing on the line conductor 16, and thus the comparator output is low. When the voltage signal from the sensor is more negative than the reference input (e.g., −0.2 volts), the output from the comparator goes high, and a forward bias is applied to the transistor Q2 that drives the integrator circuit. A capacitor C12 connected from the base of transistor Q2 to $-V_{cc}$ filters out high frequency noise. A diode D11 is connected between the comparator output and the base of the transistor Q2 to block negative signals that would discharge the capacitor C12 prematurely. The rest of the circuit of FIG. 5 is identical to that of FIG. 2.

When a fault occurs, it is desirable to isolate the branch of the distribution system in which the arcing fault occurred from the rest of the distribution system. In the system of FIG. 1, such isolation is provided by isolator #1 (24a, 24b . . . 24n) and/or isolator #2 (25a, 25b . . . 25n). Isolator #1 is designed for use in a system using a current-type sensor, as shown in FIG. 2, while isolator #2 is designed for use in a system using a voltage-type sensor, as shown in FIG. 5. Both isolator #1 and #2 may be used in a system having both a current- and a voltage-type sensor.

As shown in FIG. 2, isolator #1 comprises a capacitor C8 connected between the load line 16 and the neutral line 18 in each branch of the distribution system. The capacitor C8 is located between the line interrupter 22 and the power source 14 to provide a low impedance path for an arcing fault from the line conductor 16 to the neutral conductor 18, independent of the impedance of the load 20. More specifically, the capacitor C8 is designed to effectively short high-frequency arcing fault signals from line conductors 16 to neutral conductors 18, thus preventing a series path from being created between branch circuits and preventing the erroneous detection of arcing faults in other branch circuits. For example, with reference to FIG. 1, the isolator #1 will prevent high frequency arcing fault signals on line conductor 16a from crossing over to line conductor 16b. Accordingly, an arcing fault signal on line conductor 16a will properly trigger line interrupter 22a but will not trigger line interrupter 22b.

As shown in FIG. 5, isolator #2 comprises an inductor L2 in the load line 16 for each branch circuit. Each inductor L2 is located between the line interrupter 22 and the sensor 21 to provide an impedance for the current produced by an arcing fault.

The arcing fault detection system also includes a blocking filter 23 in each branch circuit for blocking false arcing fault signals or other nuisance output signals generated by normal operation of the load 20. Each blocking filter 23 is connected between the sensor 21 and the load 20 in each branch circuit to prevent false arcing fault signals from being delivered to the sensor 21. As seen in FIGS. 2 and 5, the preferred blocking filter includes a pair of capacitors C9a and C9b connected between the load line 16 and the neutral line 18 of each branch circuit. An inductor L3 is connected in the load line 16 between the two capacitors C9a and C9b. Preferably, the capacitors C9a and C9b have a rating across the line of about 0.47 uF. The inductor L3 has a rating for 15 amps at 500 uH and dimensions of about 1.5" diameter and 1.313" in length (e.g., Dale IHV 15–500). These values, of course, can be adjusted for the power rating of the electrical system and the loads 20.

The capacitor C9a creates a low impedance path for any series arcing that occurs upstream of that capacitor, such as arcing within the wall upstream of a noisy load. This permits series arcing to be detected in the branch containing the blocking filter. The inductor L3 creates an impedance that does most of the attenuation of the signal created by a noisy load. This inductor is sized to carry the load current of the device, which is typically 15 or 20 amperes. The second capacitor C9b reduces the amount of inductance required in the inductor L3, by creating a low impedance path across the load 20.

One of the advantages of the blocking filter 23 is that it can be used locally on a particular branch circuit that is known to connect to a load 20 which is noisy. The expense of using the blocking filter 23 is reduced since it can be used only where needed. The blocking filter 23 also allows easy retrofitting to existing electrical distribution systems in residences and commercial space.

Although the above system has been described in connection with an ordinary 120 volt system, it is applicable to the voltages of any standard, including 12, 120, 240, 480, 600 and 18500 volts. The system is suitable for use in residential, commercial and industrial applications, single-shot or multiphase systems and at all frequencies for a-c. as well as d-c. This system is applicable to automotive, aviation, and marine needs, separately derived sources such as generators or UPS, and capacitor banks needing incipient fault protection.

Figure 6:
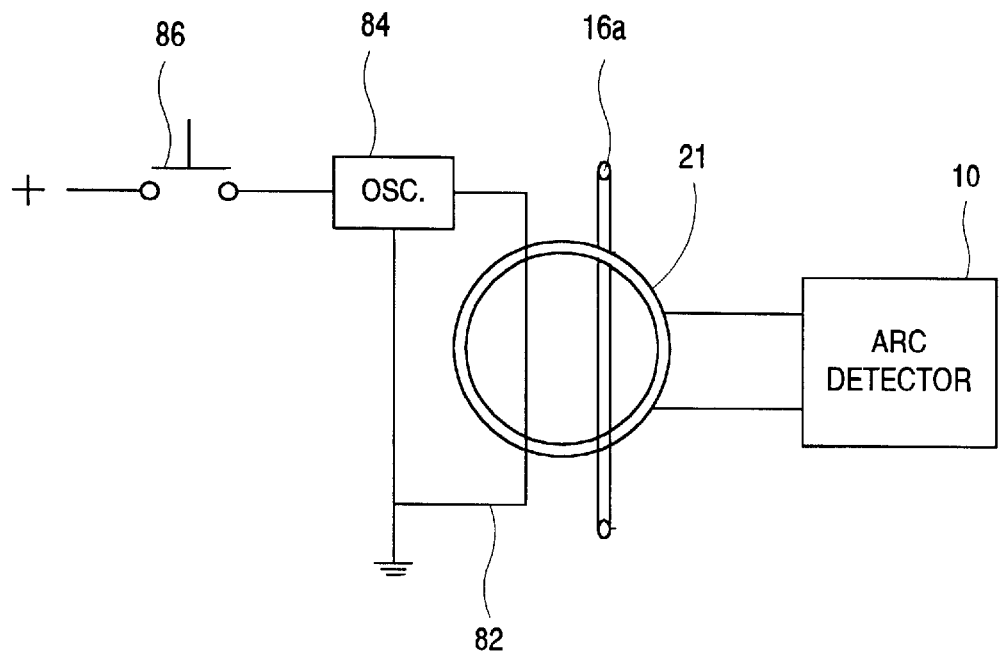
FIG. 6 is a schematic diagram of a test circuit which may be utilized in an arcing fault detection system according to principles of the present invention.

FIG. 6 illustrates a test circuit that may be used in an arcing fault detection system according to principles of the present invention. A test wire 82 passes through the sensing coil 21 together with the line conductor 16a. The test wire 82 is connected to a free running oscillator 84, which is adapted to produce a current in the test wire 82 simulating an arcing fault, preferably an alternating current with a frequency of about 10 kHz to 100 kHz. The simulated arcing fault passing through the test wire 82 is detected by sensor 21, which in turn sends a signal to the arcing fault detector circuit 10 in the same manner shown generally in FIG. 1. The arcing fault detector circuit 10 is preferably the same circuit shown in FIG. 2, but it will be appreciated any circuit which detects arcing faults may be used. The arcing fault detector circuit thereafter processes the signal produced by the sensor 21 in response to the test signal, produces a trip signal and triggers the line interrupter 22 (FIG. 2) in the same manner as it would for an actual arcing fault.

The oscillator 84 may be manually controlled through operation of a push-to-test switch 86. An operator may start the oscillator and introduce a current in the test wire 82 by depressing the push-to-test switch 86, and subsequently stop the oscillator by releasing the push-to-test switch 86. Moreover, a self-test or automatic test can be used instead of the manual test described above. For example, the switch can include a timer for automatically starting and stopping the oscillator 84 at preselected intervals.

Figure 7:
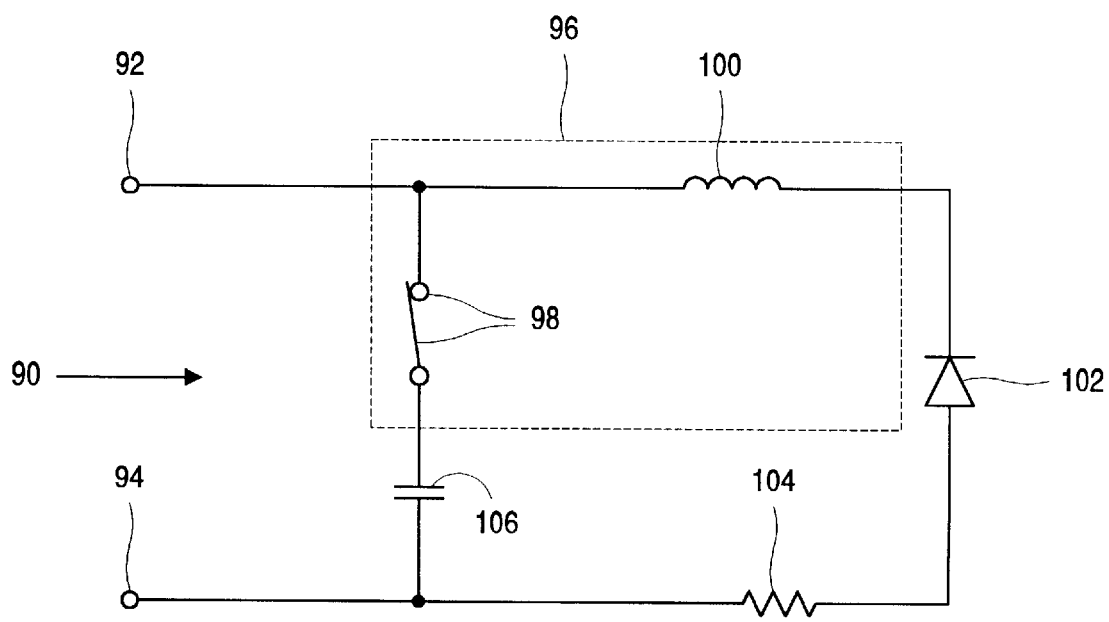
FIG. 7 is a schematic diagram of an alternative test circuit which may be utilized in an arcing fault detection system according to principles of the present invention.

An alternative test circuit 90 which may be used in arcing fault detection systems according to principles of the present invention is illustrated in FIG. 7. A first terminal 92 is connected to the line conductor and a second terminal 94 is connected to the neutral conductor of a selected branch circuit of an electrical distribution system having an arcing fault detector, as in FIG. 1. A relay 96 is connected between the first and second terminals 92 and 94. The relay 96 contains a pair of electrical contacts 98 and a relay coil 100. A diode 102 and a resistor 104 are connected between the second terminal 94 and the relay coil 100. A capacitor 106 is connected between the second terminal 94 and the electrical contacts 98. When the first and second terminals 92, 94 are attached to the line and neutral conductors of the selected branch circuit, alternating current from the branch circuit is introduced into the test circuit 90 and energizes the relay 96. The diode 102 thereafter causes the relay coil 100 to drop every half cycle, causing the electrical contacts 98 to rapidly open and close, once every cycle. This chattering effect of the electrical contacts 98 produces a signal on the line conductor which simulates an arcing fault condition. The simulated arcing fault condition is thereafter detected by the sensor 21 (FIG. 1) and processed by the arcing fault detector circuit 10 in the same manner as an actual arcing fault.

The relay 96 preferably comprises a Class 8501 Type KL-12 24VAC available from Square D Company, but it may comprise any comparable relay known in the art. The capacitor 106 preferably has a value of about 0.47 $\mu$F and is provided to increase the strength of the simulated arcing fault signal. The resistor 104 is provided to drop the 120 VAC of the branch circuit down to 24 VAC for the relay 96.

In one embodiment, the test circuit 90 is removably attachable to the line and neutral conductors of a selected branch circuit. This enables a user to externally remove and attach the test circuit to a selected branch circuit as often as needed or desired to test the arcing fault detection system. Alternatively, the test circuit 90 may be housed together with the arcing fault detector circuit in a common module.

Figure 8:
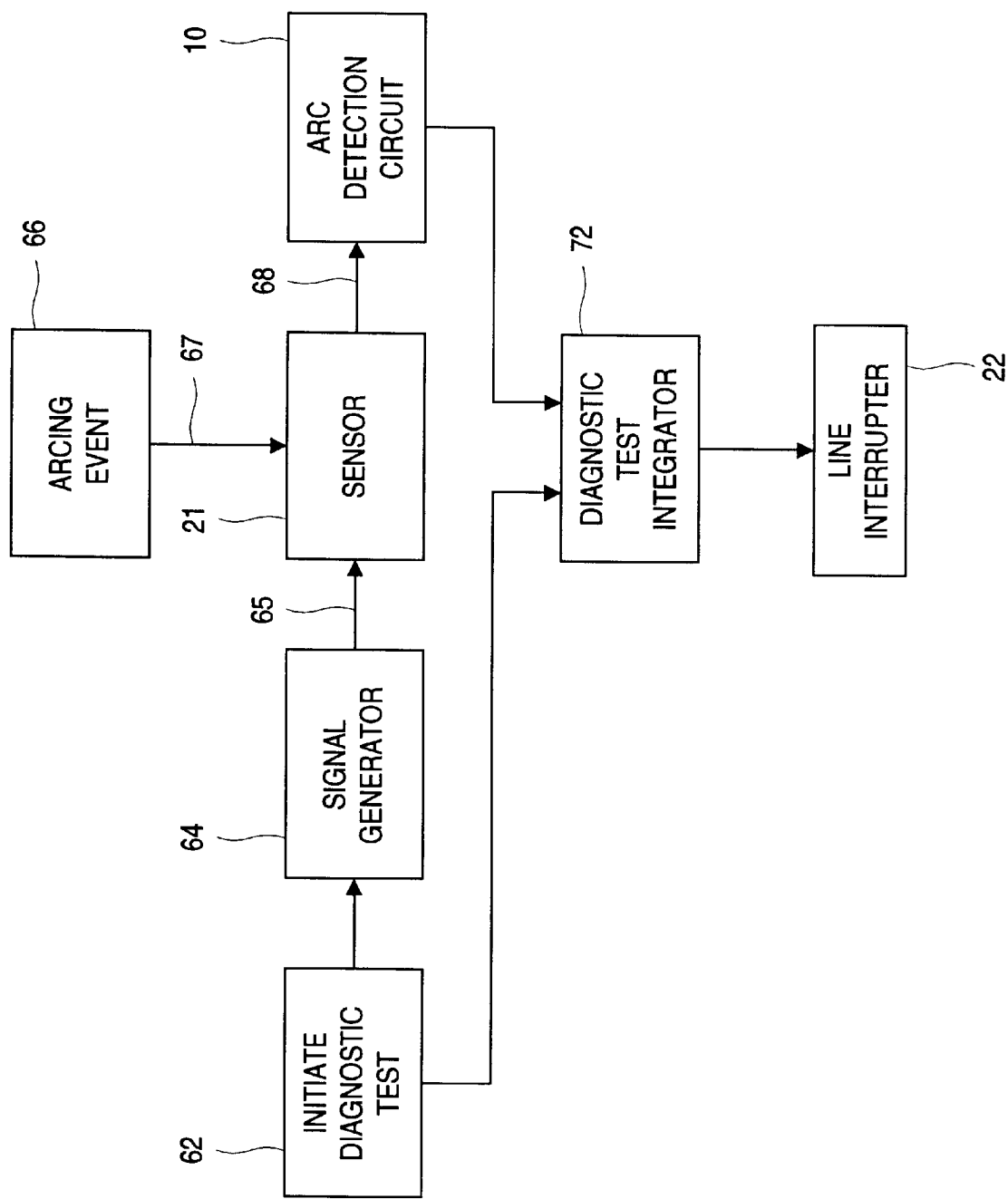
FIG. 8 is a flow chart of an arcing fault detection system and test method according to one embodiment of the present invention.

A flow chart for testing an arcing fault detection system according to principles of the present invention is illustrated in FIG. 8. Block 62 designates the initiation of a diagnostic test within the arcing fault detection system. The initiation step 62 may be accomplished automatically or under operator control. When the diagnostic test is initiated, a signal generator 64 provides a test signal 65 to a sensor 21. The test signal is designed to simulate the occurrence of an arcing fault. The signal generator 64 may comprise the oscillator 84 described in relation to FIG. 6, the test circuit 90 described in relation to FIG. 7 or any other means for producing a test signal 65 simulating an arcing fault. The sensor 21 preferably comprises a toroidal current sensing coil substantially the same as depicted in FIG. 6. The sensor 21 receives the test signal 65 and produces a rate-of-change signal 68. The rate-of-change signal 68 is processed by the arcing fault detection circuit 10 in the manner heretofore described to determine whether or not the test signal 65 represents an arcing fault. In addition, the sensor 21 also monitors the line conductor of a selected branch circuit for the occurrence of "true" arcing faults.

The arc detection circuit 10 thereafter provides an output to a diagnostic test integrator 72 indicating that an arcing fault either was detected or was not detected. The diagnostic test integrator also receives a signal from block 62 indicating whether or not the system is in test. Thus, either of four possible conditions will be received by the diagnostic test integrator 72: (1) the system is in test and an arcing fault was detected; (2) the system is in test and no arcing fault was detected; (3) the system is not in test and an arcing fault was detected; or (4) the system is not in test and no arcing fault was detected. The diagnostic test integrator 72 will produce a trip signal to trip open the contacts of a line interrupter 22 if either condition (2) or (3) occurs. Thus, a trip signal will be produced not only when a true arcing fault is present, but also when an arcing fault should have been indicated during the test protocol as a sign of operability and yet was not so indicated. Conversely, the diagnostic test integrator 72 will not produce a trip signal if either condition (1) or (4) occurs.

Where the sensor 21 comprises a toroidal winding, the arcing fault detection system may also be tested by testing the resistance of the winding. This may be accomplished by inputting a test signal having a known voltage through the winding and comparing the resistance of the winding to a known value to determine whether the winding is operating properly. Both of these steps may be accomplished while the sensor 21 is in operation. If the winding is found to be operating outside of an acceptable range above or below the known value, a trip signal is generated to interrupt the current flowing in the branch circuit associated with the sensor 21. If the winding is found to be operating properly, no trip signal is generated. In a preferred embodiment, the presence or absence of a trip signal resulting from testing the resistance of the winding is independent of the presence or absence of a trip signal from the diagnostic test integrator 72 of FIG. 8. For example, if no trip signal is produced because the coil is found to be operating properly as a result of the resistance test, a trip signal may nevertheless still be produced by the diagnostic test integrator 72 of FIG. 8 if either condition (2) or (3) occurs. Conversely, if a trip signal is produced by the resistance test because the coil resistance is not within proper limits, the line interrupter 22 will be triggered to interrupt the current in the branch circuit regardless of whether the diagnostic test integrator 72 of FIG. 8 has produced a trip signal.

While the present invention has been described with reference to one or more particular embodiments, those skilled in the art will recognize that many changes may be made thereto without departing from the spirit and scope of the present invention. Such variations are contemplated as failing within the spirit and scope of the claimed invention, as set forth in the following claims.

What is claimed is:

1. A system for detecting arcing faults in an electrical distribution system that includes a line conductor connected to a utility power transformer, said system comprising:

a current transformer coupled to said line conductor for monitoring the rate of change of electrical current in the line conductor and producing a signal representing the rate of change, means for generating an arcing-fault-detection signal in response to said rate-of-change signal, a test line coupled to said current transformer in the same manner as said line conductor for subjecting said transformer to a test signal simulating a line current produced by an arcing fault, and a signal generator connected to said test line for producing said test signal.

2. The system of claim 1 wherein said test signal is an alternating signal having a frequency substantially above the frequency of the power signal.

3. The system of claim 2 wherein said test signal has a frequency above 60 Hz and below about 1 MHz.

4. The system of claim 1 wherein said test signal is a repetitive oscillating signal.

5. The system of claim 1 wherein said current transformer is a toroid, and said line conductor and said test line pass through said toroid.

6. The system of claim 1 wherein said arcing-fault-detection signal is produced in response to the occurrence of signals having frequencies substantially above the frequency of the power signal, on said line conductor.

7. A method of detecting arcing faults in an electrical distribution system that includes a line conductor connected to a utility power transformer, said method comprising the steps of monitoring the rate of change of electrical current in the line conductor with a current transformer, and producing a signal representing the rate of change, generating an arcing-fault-detection signal in response to said rate-of-change signal, and applying a test signal to said current transformer through a test line coupled to said transformer in the same manner as said line conductor, and said test signal simulating a line current produced by an arcing fault, said test signal being produced by a signal generator connected to said test line.

8. The method of claim 7 wherein said test signal is an alternating signal having a frequency substantially above the frequency of the power signal.

9. The method of claim 8 wherein said test signal has a frequency above 60 Hz and below about 1 MHz.

10. The method of claim 7 wherein said test signal is a repetitive oscillating signal.

11. The method of claim 7 wherein said current transformer is a toroid, and said line conductor and said test line pass through said toroid.

12. The method of claim 11 wherein said arcing-fault-detection signal is produced in response to the occurrence of signals having frequencies substantially above the frequency of the power signal, on said line conductor.

13. A test method for an arcing fault detection system in an electrical distribution network having a line conductor carrying an electrical signal between a power source and a load, said arcing fault detection system including a sensor coupled to said line conductor for monitoring said electrical signal and generating a sensor signal representing said electrical signal, said arcing fault detection system generating an arc-indicative signal in response to said sensor signal having characteristics indicative of an arcing fault, said method comprising the steps of:

coupling said sensor to a test line simultaneously with said line conductor, and periodically producing a test signal on said test line, said sensor simultaneously monitoring said test signal and said electrical signal when said test signal is present on said test line, said sensor signal representing both said test signal and said electrical signal when said test signal is present on said test line, said arcing fault detection system generating an arc-indicative signal in response to said sensor signal associated with either of said test line or said line conductor having characteristics indicative of an arcing fault.

14. The test method of claim 13 further comprising the step of generating a trip signal to trigger the interruption of the electrical signal on said line conductor, said step of generating a trip signal being accomplished when said test signal is not present on said test line and said arc-indicative signal was produced in response to the sensor signal representing both said test signal and said electrical signal.

15. The test method of claim 14 wherein said step of generating a trip signal is further accomplished when said test signal is present on said test line and said arc-indicative signal was not produced in response to the sensor signal representing both said test signal and said electrical signal.

16. The test method of claim 15 wherein said step of generating a trip signal is inhibited when said test signal is present on said test line and said arc-indicative signal is produced in response to the sensor signal representing both said test signal and said electrical signal.

17. The method of claim 13 wherein said sensor monitors the rate of change of current in said line conductor and generates a sensor signal representing said rate of change of current.

18. The method of claim 13 wherein said sensor monitors the rate of change of voltage on said line conductor and generates a sensor signal representing said rate of change of voltage.

19. A testing apparatus for an arcing fault detection system in an electrical distribution network having a line conductor carrying an electrical signal between a power source and a load, said arcing fault detection system including a sensor coupled to said line conductor for monitoring said electrical signal and generating a sensor signal representing said electrical signal, said arcing fault detection system generating an arc-indicative signal in response to said sensor signal having characteristics indicative of an arcing fault, said testing apparatus comprising:
    a test line coupled to said sensor simultaneously with said line conductor, and
    means for periodically producing a test signal on said test line, said sensor simultaneously monitoring said test signal and said electrical signal when said test signal is present on said test line, said sensor signal representing both said test signal and said electrical signal when said test signal is present on said test line, said arcing fault detection system generating an arc-indicative signal in response to said sensor signal associated with either of said test line or said line conductor having characteristics indicative of an arcing fault.

20. The testing apparatus of claim 19 further comprising a diagnostic test integrator for evaluating status conditions of said test signal and said arc-indicative signal and generating a trip signal to trigger the interruption of the electrical signal in response to certain status conditions of said test signal and said arc-indicative signal.

21. The testing apparatus of claim 20 wherein said diagnostic test integrator generates said trip signal when said test signal is not present on said test line and said arc-indicative signal was produced in response to the sensor signal representing both said test signal and said electrical signal.

22. The testing apparatus of claim 20 wherein said diagnostic test integrator generates said trip signal when said test signal is present on said test line and said arc-indicative signal was not produced in response to the sensor signal representing both said test signal and said electrical signal.

23. The testing apparatus of claim 20 wherein said diagnostic test integrator does not generate said trip signal when said test signal is present on said test line and said arc-indicative signal is produced in response to the sensor signal representing both said test signal and said electrical signal.

24. The testing apparatus of claim 19 wherein said sensor monitors the rate of change of current in said line conductor and generates a sensor signal representing said rate of change of current.

25. The testing apparatus of claim 19 wherein said sensor monitors the rate of change of voltage on said line conductor and generates a sensor signal representing said rate of change of voltage.

26. The testing apparatus of claim 19 further comprising an oscillator connected to said test line for producing said test signal on said test line.

27. A testing apparatus for an arcing fault detection system in an electrical distribution network having a line and neutral conductor carrying an electrical signal between a power source and a load, said arcing fault detection system including a sensor coupled to said line conductor for monitoring said electrical signal and generating a sensor signal representing said electrical signal, said arcing fault detection system generating an arc-indicative signal in response to said sensor signal having characteristics indicative of an arcing fault, said testing apparatus comprising:
    a test circuit removably attachable to said line and neutral conductor, said test circuit being adapted to produce a simulated arcing fault signal when attached to said line and neutral conductor, said sensor being adapted to monitor said simulated arcing fault signal and generate said sensor signal representing said simulated arcing fault signal, said arcing fault detection system generating an arc-indicative signal in response to said sensor signal associated with said simulated arcing fault signal having characteristics indicative of an arcing fault.

28. The testing apparatus of claim 27 wherein said test circuit comprises:
    a first terminal removably attachable to said line conductor;
    a second terminal removably attachable to said neutral conductor;
    a relay comprising an electrical switch and a relay coil connected between the first and second terminals, the electrical switch rapidly opening and closing to create said simulated arcing fault signal when said first and second terminals are attached to said line and neutral conductors.

* * * * *